United States Patent [19]
Pipes

[11] Patent Number: 5,152,655
[45] Date of Patent: Oct. 6, 1992

[54] MATERIAL HANDLING APPARATUS

[75] Inventor: George R. Pipes, Salt Lake City, Utah

[73] Assignee: Eaton-Kenway, Inc., Salt Lake City, Utah

[21] Appl. No.: 687,645

[22] Filed: Apr. 19, 1991

[51] Int. Cl.$^5$ .............................................. B65G 67/02
[52] U.S. Cl. ..................... 414/344; 414/349; 414/352; 414/390; 414/749; 414/779; 414/905
[58] Field of Search ............. 414/344, 349, 352, 389, 414/390, 416, 749, 778, 779, 783, 905; 198/412

[56] References Cited

U.S. PATENT DOCUMENTS

| | | | |
|---|---|---|---|
| 4,041,686 | 8/1977 | Inaba et al. | 414/344 X |
| 4,184,799 | 1/1980 | Arndt | 414/783 X |
| 4,274,779 | 6/1981 | Longinotti | 414/416 X |
| 4,293,272 | 10/1981 | Jellema | 414/416 X |
| 4,601,386 | 7/1986 | Antonello | 414/905 X |

FOREIGN PATENT DOCUMENTS

| | | | |
|---|---|---|---|
| 648039 | 5/1964 | Belgium | 198/412 |
| 193771 | 9/1986 | European Pat. Off. | 414/416 |
| 742110 | 6/1980 | U.S.S.R. | 414/905 |

Primary Examiner—David A. Bucci
Attorney, Agent, or Firm—F. M. Sajovec

[57] ABSTRACT

A load rotator assembly rotates and positions loads which are transferred between vehicles which move along aisles. The load rotator assembly includes a carriage which sequentially receives loads from one of the vehicles. A carriage drive assembly rotates the carriage about a vertical axis while maintaining the load on the carriage offset to one side of a vertical plane through the ends of loads at storage locations to eliminate any possibility of interference between the load and a stacker crane which transfers the load to one of the storage locations. The carriage drive assembly is operable to move the carriage toward the vertical plane. By positioning a load on the carriage with its end in the vertical plane, the stacker crane can pick up the load from the carriage and move the load to a storage location. The carriage drive assembly includes a double geneva drive mechanism having upper and lower geneva plates.

18 Claims, 10 Drawing Sheets

Fig.5

MATERIAL HANDLING APPARATUS

BACKGROUND OF THE INVENTION

The present invention relates to a material handling apparatus in which loads are transferred between vehicles During the operation of an automated warehouse facility, incoming loads may be positioned on an automatic guided vehicle. The automatic guided vehicle is movable along a spur from a main aisle to a storage aisle which extends parallel to the main aisle. The load is then transferred from the automatic guided vehicle to a stacker crane. The stacker crane moves the load along the storage aisle to a storage location where the load is to be stored. The load is then transferred from the stacker crane to the storage location.

When a load is to be removed from the warehouse facility, the stacker crane moves to the storage location where the desired load is located. The stacker crane picks up the desired load and moves the load to the main aisle. At the main aisle, the load is transferred from the stacker crane to the automatic guided vehicle. The automatic guided vehicle moves along the main aisle to a location from which the load is moved from the warehouse facility.

SUMMARY OF THE INVENTION

An improved material handling apparatus constructed in accordance with the present invention includes a load rotator assembly which sequentially positions loads for transfer between vehicles. The load rotator assembly includes a carriage which receives loads from a first vehicle which is movable along a main aisle. The carriage rotates the load about a vertical axis to position the load for engagement by a second vehicle which moves along a storage aisle.

To eliminate any possibility of engagement of a load with the second vehicle during rotation of the load by the load rotator assembly, the load is maintained to one side of a vertical plane extending through the ends of loads at storage locations during rotation of the load by the load rotator assembly. To position the load for engagement by the second vehicle and for subsequent transfer to a storage location, the carriage is moved toward the vertical plane to move the end of the load to a desired location for engagement by the second vehicle which moves along the storage aisle.

The carriage is rotatably mounted on a shuttle which is movable toward and away from the storage aisle. A carriage drive assembly is mounted on the shuttle and includes a geneva plate which is connected with the carriage. The geneva plate is rotated to rotate the carriage to align the load for transfer to the vehicle which moves along the storage aisle. A second geneva plate is rotated relative to the shuttle to move the shuttle and carriage toward the storage aisle. This movement of the shuttle positions the end of the load for engagement by the second vehicle which moves along the storage aisle.

BRIEF DESCRIPTION OF THE DRAWINGS

The foregoing and other features of the present invention will become apparent to one skilled in the art upon a consideration of the following description of the invention with reference to the accompanying drawings, wherein.

DESCRIPTION OF SPECIFIC PREFERRED EMBODIMENTS OF THE INVENTION

General Description

Figure 1:
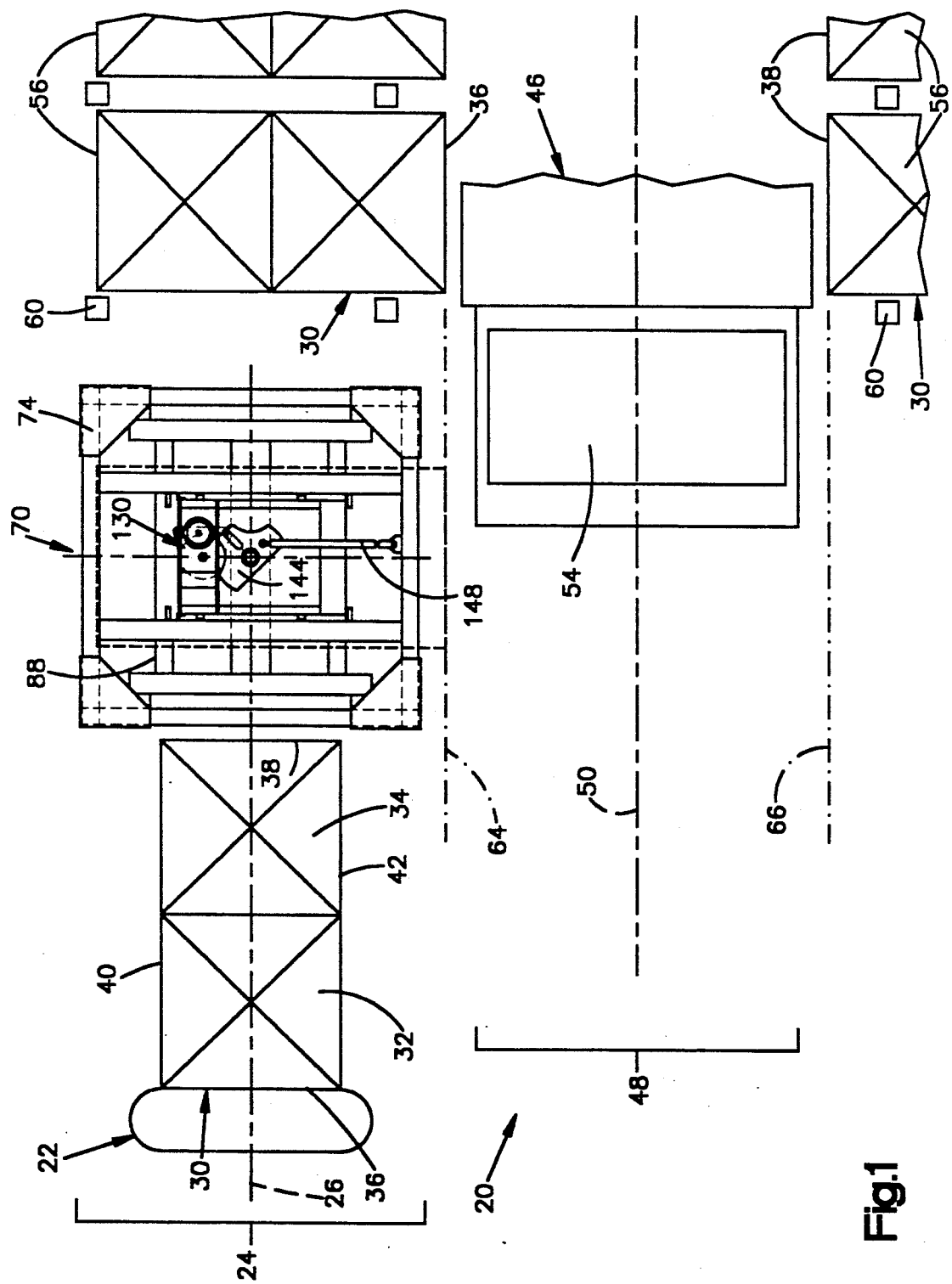
FIG. 1 is a plan view of an improved material handling apparatus having a load rotator assembly constructed in accordance with the present invention.
Figure 2:
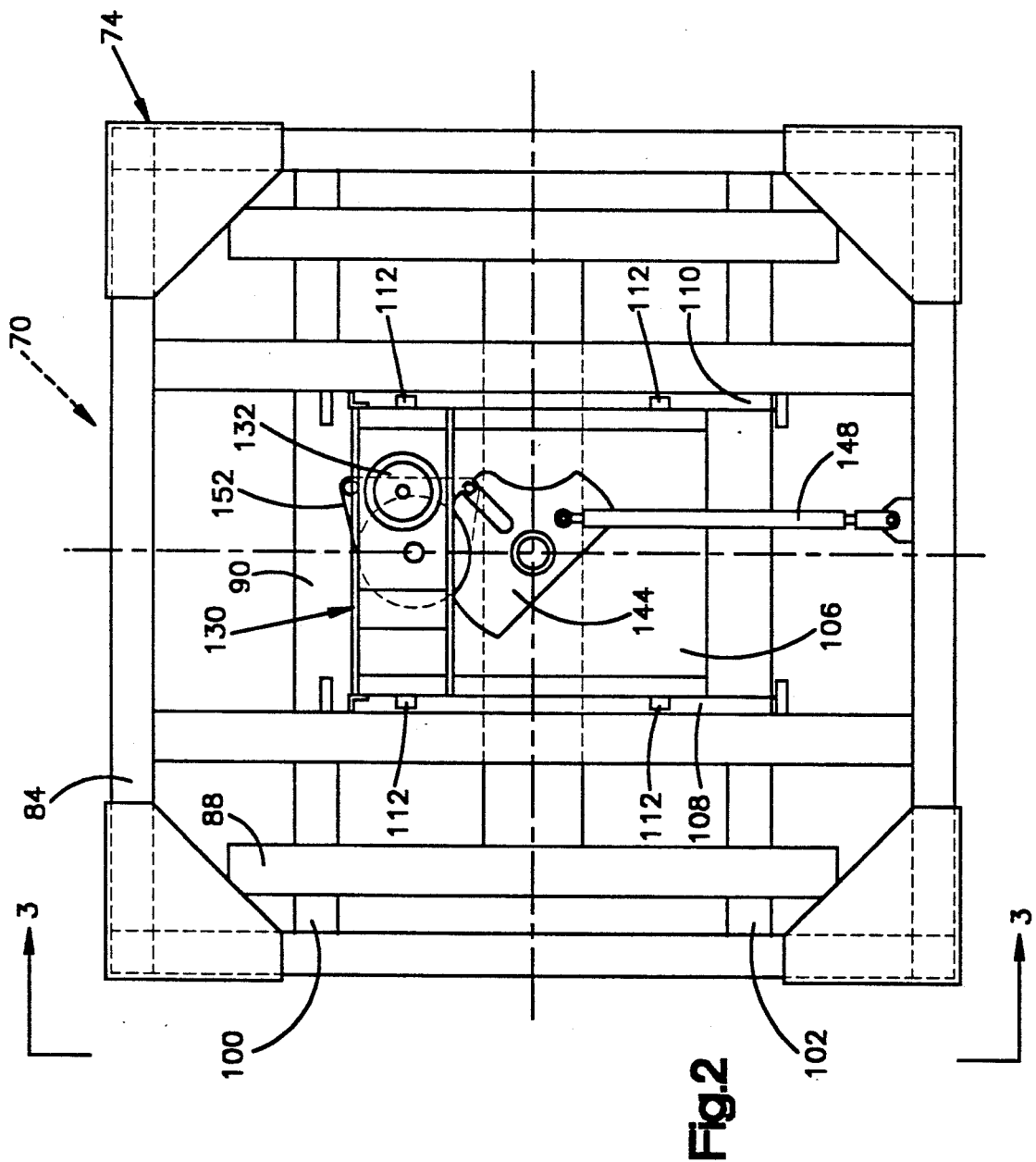
FIG. 2 is an enlarged plan view of the load rotator assembly of FIG. 1.

A material handling apparatus 20 (FIG. 1) includes a first guided vehicle 22 which is movable along a main aisle 24 having a longitudinal central axis 26. The vehicle 22 is of a known construction and moves along the main aisle 24 without an operator on board the vehicle. The vehicle 22 may be guided along the main aisle 24 by following a wire which extends along the central axis 26 of the main aisle, or by responding to a radio control system, or by other known guidance systems.

The vehicle 22 includes a lift table 28 which can be raised and lowered through a relatively small distance to lift a load from a support surface and to deposit a load on a support surface. However, the lift table 28 cannot be raised through a relatively large distance necessary to enable a load to be placed in any one of a plurality of storage locations in a vertical stack of storage locations.

A load 30 is disposed on the lift table 28 of the vehicle 22. In the present instance, the load 30 is formed in two sections 32 and 34 (FIG. 1) disposed on separate pallets which are located in a side-by-side relationship on the vehicle 22. The load 30 has an elongated configuration with ends 36 and 38 which extend parallel to the central axis 26 of the main aisle 24. The load 30 also has longitudinally extending sides 40 and 42 which extend perpendicular to the central axis 26 of the main aisle 24.

A second vehicle or stacker crane 46 is movable along a storage aisle 48 having a longitudinal central axis 50 which extends parallel to the central axis 26 of the main aisle 24. The stacker crane 46 is of a known construction and has a shuttle 54. The shuttle 54 is extendible to either the left or the right of the stacker crane in a direction perpendicular to the central axis 50 of the storage aisle 48.

The stacker crane 46 is used to transfer loads to and from storage locations 56. The storage locations 56 are disposed in vertical and horizontal rows along opposite sides of the storage aisle 48. The shuttle 54 can be raised and lowered through a relatively large distance to enable the stacker crane 46 to transfer loads to and from upper and lower storage locations 56 in a vertical row of storage locations.

The stacker crane 46, like the vehicle 22, is controlled without the benefit of an operator on board the stacker crane. Thus, the stacker crane 46 is remotely controlled to move along the storage aisle 48 between the various storage locations 56. The raising and lowering of the shuttle 54 to align the shuttle with upper and lower storage locations is also remotely controlled in a known manner. It should be noted that there is relatively small clearance between the stacker crane 46 and the ends 36 and 38 of loads 30 disposed on opposite sides of the storage aisle 48 at the various storage locations 56.

Since the longitudinal central axis of a load 30 on the vehicle 22 extends perpendicular to the longitudinal central axis of a load at a storage location 56, the orientation of a load 30 must be changed when the load is to be transferred from the vehicle 22 to the stacker crane 46. Thus, the load 30 must be rotated through 90° from an orientation in which the longitudinal central axis of the load extends parallel to the central axis 26 of the main aisle 24 to an orientation in which the longitudinal central axis of the load extends perpendicular to the central axis 50 of the storage aisle 48 and the central axis 26 of the main aisle 24.

When the loads 30 are placed at the storage locations 56, the ends 36 of the loads on one side, that is the upper side as viewed in FIG. 1, of the storage aisle 48 are disposed in a vertical plane 64. Similarly, the ends 38 of the loads 30 on the opposite side of the storage aisle 48, that is the lower side of the aisle 48 as viewed in FIG. 1, are disposed in a vertical plane 66 through the ends 38 of the loads. The vertical planes 64 and 66 extend parallel to the central axis 50 of the storage aisle 48 and to the central axis 26 of the main aisle 24.

In order to position the loads 30 at the storage locations 56 with the ends 36 and 38 of the loads in the vertical planes 64 and 66, it is necessary for the loads to be accurately positioned on the stacker crane shuttle 54. This is because the shuttle 54 is always extended for the same distance from either side of the central axis of the stacker crane 46 to position a load 30 at a storage location 56.

When a load 30 is to be transferred from the vehicle 22 to the stacker crane 46, it is necessary to rotate the load about a vertical axis in order to position the load for engagement by the shuttle 54 of the stacker crane 46.

However, it is desirable to rotate the load 30 without having the load extend through the vertical plane 64 containing the ends 36 of the loads at the storage locations 56. This is so that the load 30 does not project into the storage aisle 48 and the path of movement of the stacker crane 46 as the load is rotated. By rotating the load 30 with the load to one side of the storage aisle 40, there can be no interference between the load and the stacker crane 46.

An improved load rotator assembly 70 is constructed in accordance with the present invention and is operable to rotate a load 30 through 90° about a vertical axis through the center of the load to change the orientation of the load. Thus, when a load is to be transferred from the vehicle 22 to the stacker crane 46, the load rotator assembly 70 is operable to rotate the load 30 in a counterclockwise direction, as viewed in FIG. 1, about a vertical axis through the center of the load. This moves the load 30 from an orientation in which the end 36 of the load extends perpendicular to the central axis 50 of the storage aisle 48 to an orientation in which the end 36 of the load extends parallel to the central axis of the storage aisle. Similarly, when a load is to be transferred from the stacker crane 46 to the vehicle 22, the load rotator assembly 70 is operable to rotate the load 30 in a clockwise direction, as viewed in FIG. 1, about a vertical axis through the center of the load. This moves the load 30 from an orientation in which the end 36 of the load extends parallel to the central axis 50 of the storage aisle 48 to an orientation in which the end 36 of the load extends perpendicular to the central axis of the storage aisle.

To eliminate any possibility of interference between the stacker crane 46 and load 30 as the load is being rotated, the load is rotated while it is entirely on the same side of the vertical plane 64 as the load rotator assembly 70. When a load 30 is to be transferred from the vehicle 22 to the stacker crane 46, once the load has been rotated, the end 36 of the load is moved along a linear horizontal path to the plane 64 to accurately position the load for engagement by the shuttle 54 of the stacker crane. When a load is to be transferred from the stacker crane 46 to the vehicle 22, the load is initially positioned by the stacker crane with the end 36 of the load at the vertical plane 64. Before the load is rotated, the end 36 of the load is moved away from the vertical plane 64, along the linear horizontal path, for a distance sufficient to enable the load to be rotated through 90° without having the corners of the load pass through the vertical plane 64.

Although it is preferred to use the load rotator assembly 70 in conjunction with the transfer of loads between the vehicle 22 and stacker crane 46, it should be understood that the load rotator assembly could be used in conjunction with the transfer of loads between many different types of load handling devices. In the embodiment of the invention illustrated in FIG. 1, there is relatively little clearance between sides of the stacker crane 46 and the ends 36 and 38 of the loads 30 on opposite sides of the storage aisle 48. Therefore, it is preferred to sequentially rotate the loads 30 about their vertical central axes without having any portion of the loads extend into the storage aisle 48. However, if there was a larger clearance between the stacker crane and the ends 36 and 38 of the loads 30 in the storage locations 56 on opposite sides of the storage aisle 48, a small portion of the load could be allowed to project through the vertical plane 64 during rotation of the load.

Load Rotator Assembly

During the transfer of a load 30 from the vehicle 22 to the stacker crane 46, the load rotator assembly 70 rotates the load about a vertical axis to orient the load 30 for pickup by the shuttle 54 on the stacker crane. The load rotator assembly 70 also moves the load 30 along a linear horizontal path to position the end 36 of the load relative to the vertical planes 64 and 66. By positioning the end 36 of the load 30 at the vertical plane 64, the stacker crane 46 can pick up the load from the load rotator assembly 70, move along the storage aisle 48 with the load, and position the load at a storage location 56 on either side of the aisle with an end of the load in one of the planes 64 or 66.

The load rotator assembly 70 includes a stationary base or main frame 74 (FIGS. 1-4). The main frame 74 includes four vertically extending posts 76, 78, 80, and 82 (FIG. 5) which are fixedly secured to the floor. A rectangular bridge or upper section 84 extends between the upper end portions of the posts 76-82.

A load carriage 88 (FIGS. 2-5) is supported from the main frame 74. The load carriage 88 holds the load 30 as the load is rotated about vertical axis through the center of the load carriage. The load carriage 88 also holds the load 30 as the load is being moved relative to the vertical planes 64 and 66 during the transfer of a load between the vehicle 22 and stacker crane 46.

The load carriage 88 includes a rectangular main or upper section 90 (FIGS. 2-5). A plurality of vertical support members 92, 94, 96, and 98 (FIG. 5) extend downwardly from the main section 90. A pair of parallel horizontal load support rails 100 and 102 extend between the vertical support members 92, 94, 96, and 98. The load support rails 102 and 100 are disposed inside of a rectangular space which encloses the outside of the posts 76, 78, 80 and 82 of the main frame 74. However, the load carriage 88 can be rotated about its vertical central axis without interference with the posts 76, 78, 80 and 82 of the main frame 74.

Figure 4:
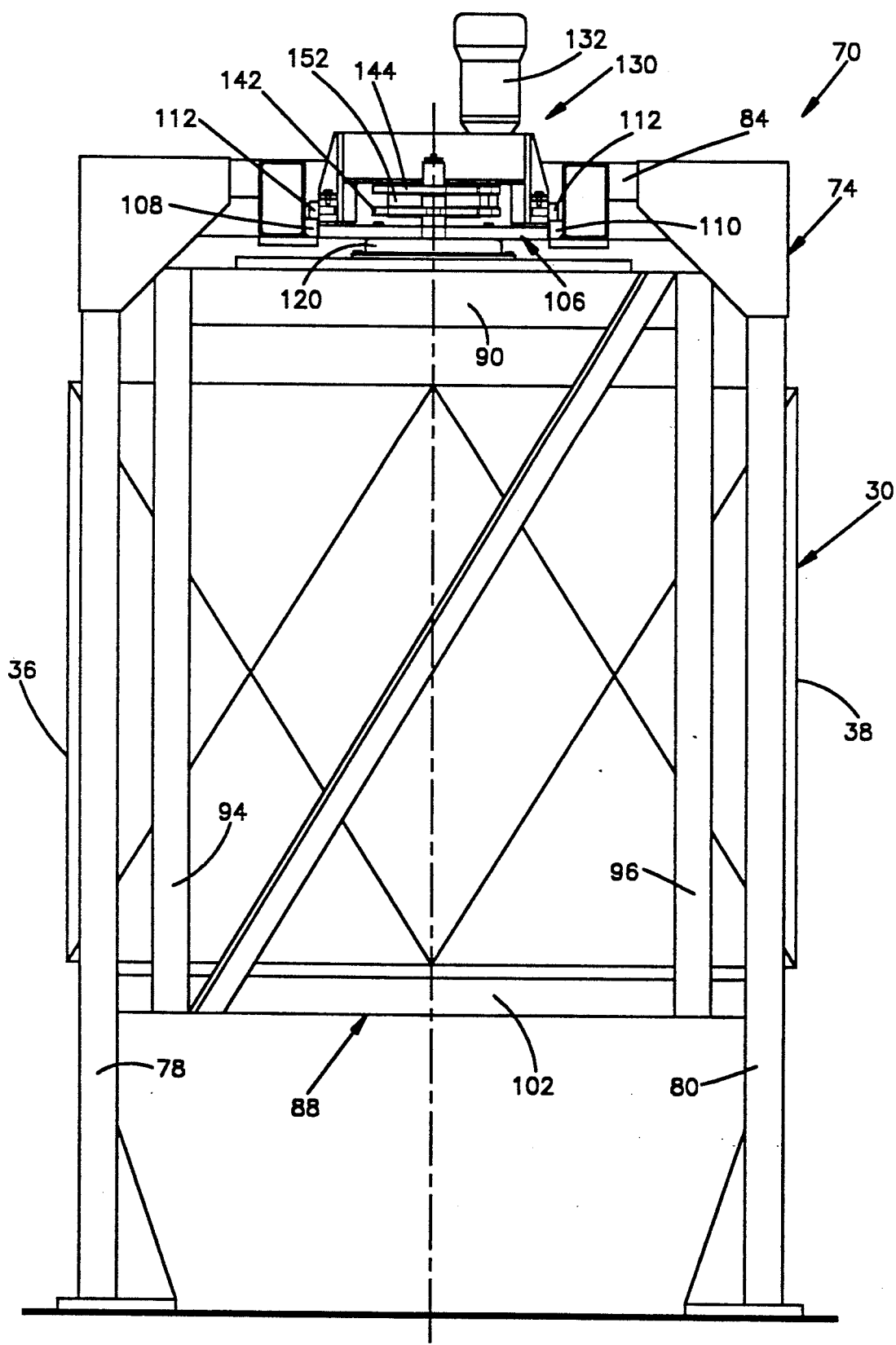
FIG. 4 is a side elevational view, taken generally along the line 4—4 of FIG. 3, further illustrating the relationship of the load to the carriage and main frame of the load rotator assembly.
Figure 5:
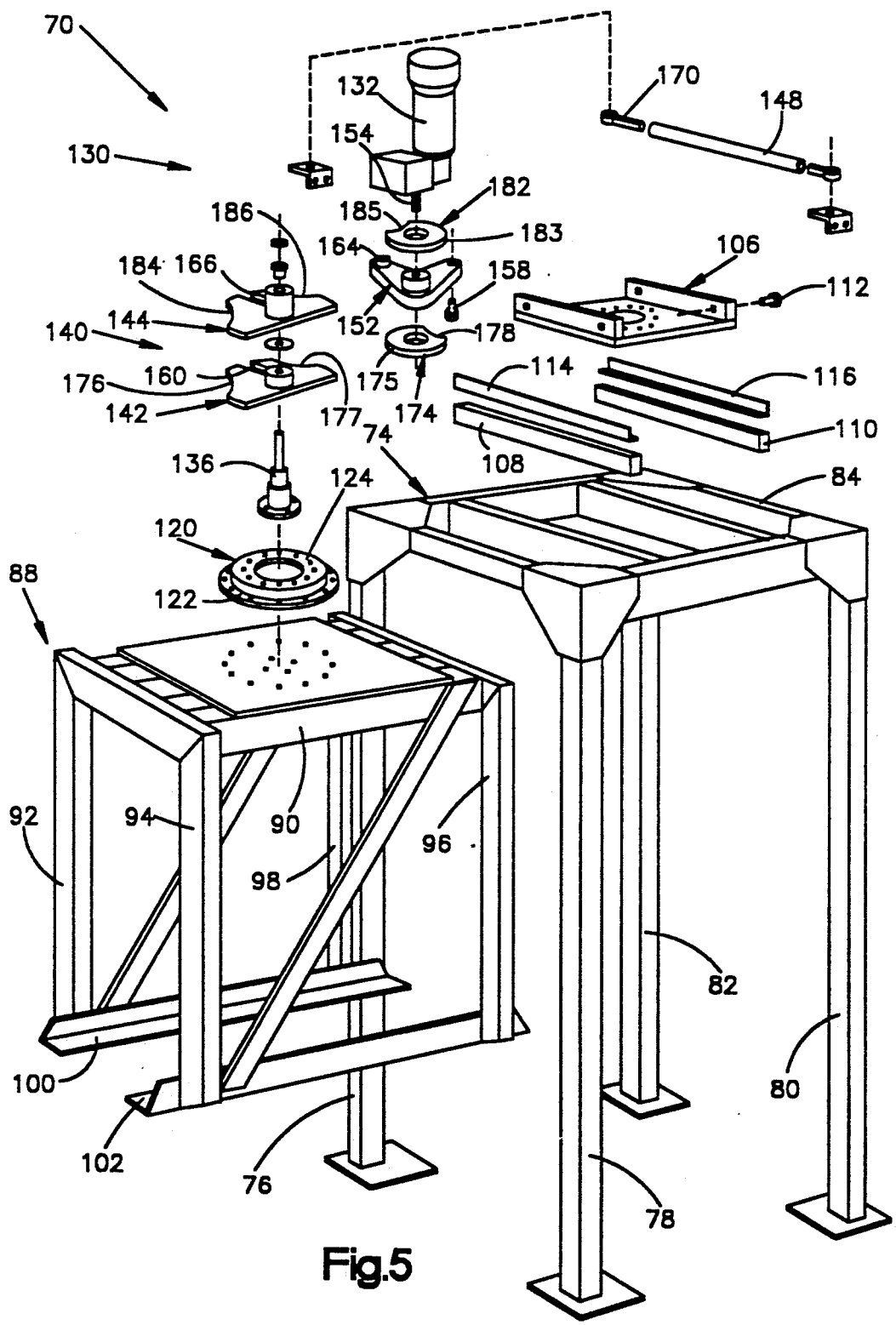
FIG. 5 is an exploded and somewhat simplified pictorial illustration of components of the load rotator assembly of FIGS. 2-4.

The load carriage 88 is rotatably suspended from a shuttle 106 (FIGS. 4 and 5). The shuttle 106 is movable along parallel horizontal guide rails 108 and 110 connected with the bridge section 84 of the main frame 74. Thus, a plurality of rollers 112 (FIG. 6) extend outwardly from opposite sides of the shuttle 106 and roll along the guide rails 108 and 110. A pair of retainer members or angles 114 and 116 (FIG. 5) engage the upper sides of the rollers 112 to hold the rollers in engagement with the rails 108 and 110.

The shuttle 106 is movable along a straight horizontal path between a retracted position (FIGS. 6 and 9) in which the shuttle 106 and load carriage 88 are spaced a relatively large distance from the vertical planes 64 and 66 and an extended position (FIG. 10) in which the shuttle 106 is relatively close to the planes 64 and 66 (FIG. 1). Movement of the shuttle 106 along the linear guide rails 108 and 110 enables the load carriage 88 (FIG. 5) to be moved to position the end 36 of a load on the carriage in a desired position relative to vertical planes 64 and 66.

The load carriage 88 is rotatably supported from the shuttle 106 by a bearing assembly 120 (FIGS. 4, 5, 7 and 8). A base 122 (FIG. 7) of the bearing assembly 120 is fixedly connected to a central portion of the upper section 90 of the load carriage 88. An upper section 124 of the bearing assembly 120 is fixedly connected to a central portion of the shuttle 106. The bearing assembly 120 enables the carriage 88 to be easily rotated relative to the shuttle 106 about a vertical central axis of the carriage.

A carriage drive assembly 130 (FIGS. 5 and 8) is operable to rotate the carriage 88 relative to the shuttle 106 about a vertical central axis of the carriage. In addition, the carriage drive assembly 130 is operable to move the shuttle 106 and carriage 88 relative to the main frame 74. Movement of the shuttle 106 and carriage 88 relative to the main frame 74 positions a load on the carriage 88 relative to the vertical planes 64 and 66.

The carriage drive assembly 130 (FIG. 5) includes a single reversible electric motor 132. The motor 132 is mounted on the shuttle 106 for movement therewith relative to the main frame 74. A speed reducer and brake (of known construction) are connected with the motor 132.

The carriage drive assembly 130 is operable to rotate the carriage 88 while the shuttle 106 is stationary relative to the main frame 74. In addition, the carriage drive assembly 130 is operable to move the shuttle 106 and carriage 88 relative to the main frame 74 while the carriage is held against rotation relative to the shuttle. Thus, the carriage 88 can be rotated relative to the shuttle 106 to align the end 36 of a load 30 with the vertical plane 64. The shuttle and carriage are then movable together toward the vertical plane 64 to position the end 36 of the load 30 at the plane 64.

In the embodiment of the invention illustrated in FIGS. 1-10, rotation of the carriage 88 relative to the shuttle 106 is completed before initiating movement of the shuttle relative to the main frame 74. However, movement of the shuttle 106 relative to the main frame 74 could begin during completion of rotation of the carriage 88 relative to the shuttle 106. Regardless of whether or not the carriage 88 is rotated during a portion of the movement of the shuttle 106, a load 30 supported by the carriage 88 is maintained to one side of the vertical plane 64 (FIG. 1) during rotation of the load and carriage. Therefore, there is no possibility of interference between the stacker crane 46 and the rotating load 30.

Carriage Drive Assembly

Figure 7:
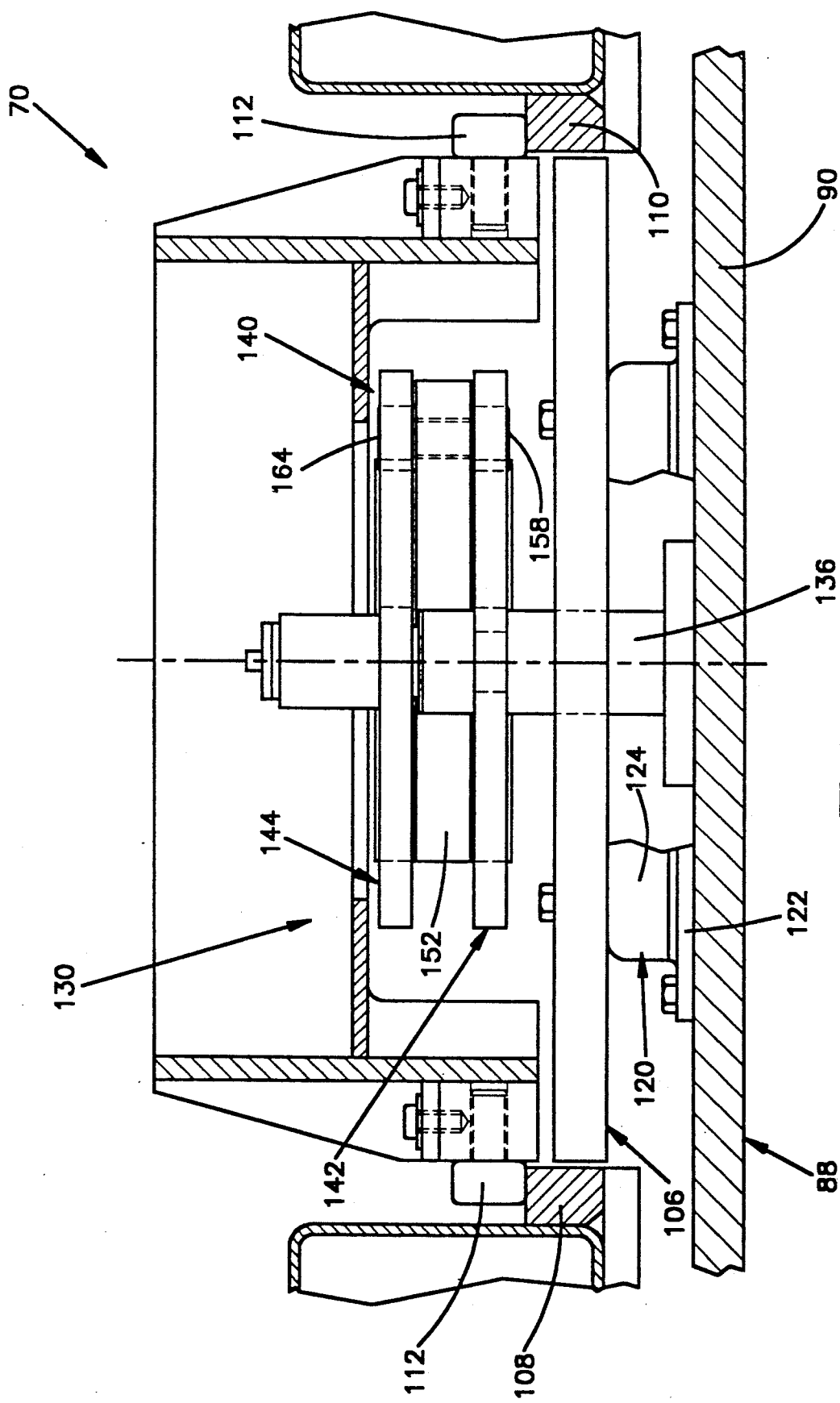
FIG. 7 is an elevational view, taken generally along the line 7—7 of FIG. 6, illustrating the relationship between upper and lower geneva plates and a geneva driver plate in the carriage drive assembly, other components of the load rotator assembly having been removed for purposes of clarity of illustration.
Figure 8:
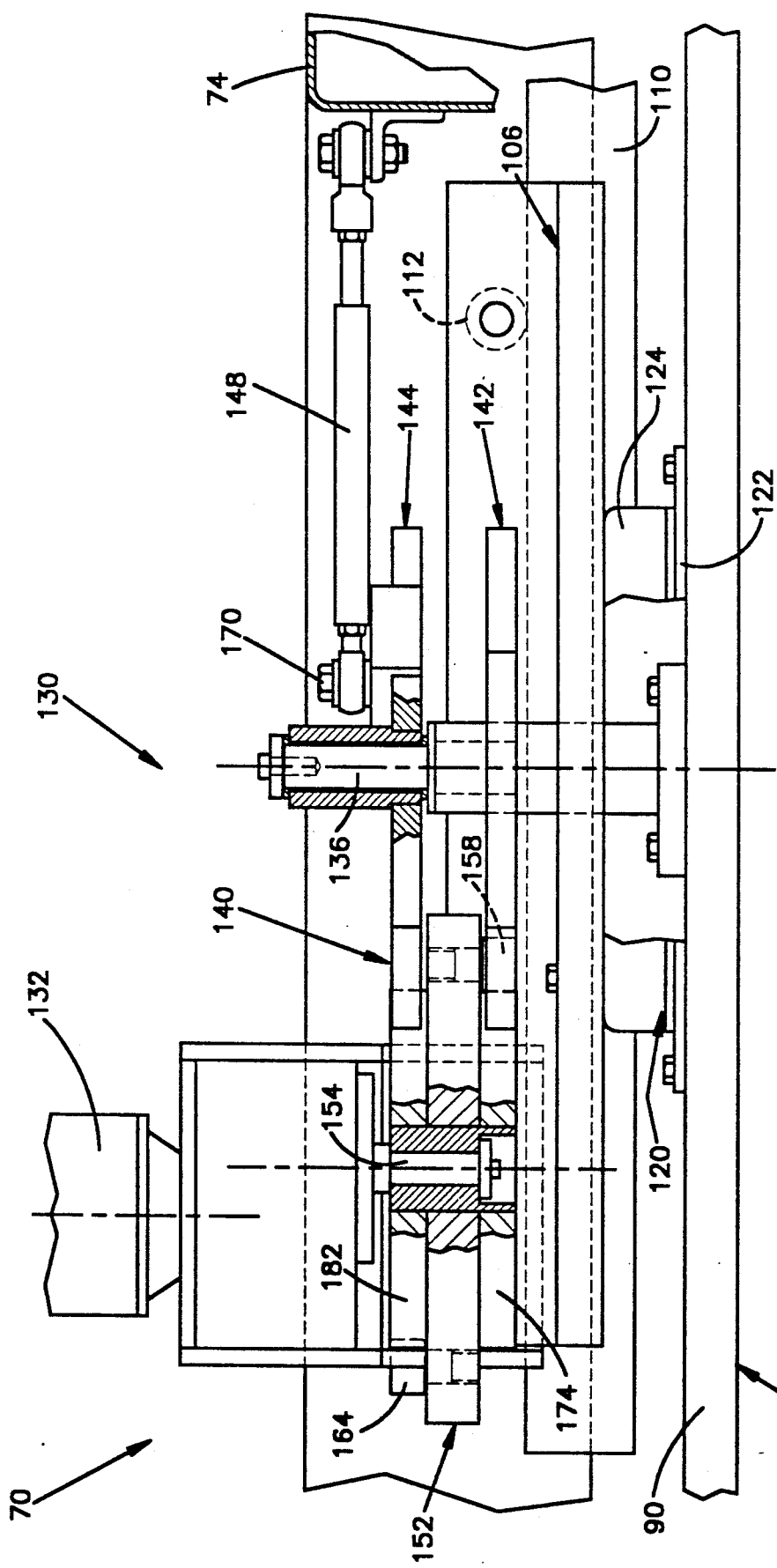
FIG. 8 is a partially broken away, fragmentary sectional view, taken generally along the line 8—8 of FIG. 6, illustrating the relationship between the upper and lower geneva plates, geneva driver plate, and a reaction link which interconnects the upper geneva plate and the main frame of the load rotator assembly.

The carriage drive assembly 130 includes a vertical stub shaft 136 (FIGS. 5, 7 and 8). The stub shaft 136 is fixedly connected to the main section 90 of the carriage 88. The vertical central axis of the stub shaft 136 is coincident with a vertical central axis of the carriage 88.

The carriage drive assembly 130 also includes a double geneva drive mechanism 140 which cooperates with the carriage 88 and main frame 74 (FIG. 5). The double geneva drive mechanism 140 is operable to rotate the carriage and to move the shuttle 106 and carriage along a linear path relative to the main frame. The double geneva drive mechanism 140 includes a lower geneva plate 142 (FIGS. 5, 7, 8 and 9) which is fixedly connected to the stub shaft 136. Rotation of the lower geneva plate 142 rotates the stub shaft 136 and carriage 88 about their coincident vertical central axes.

The double geneva drive mechanism 140 also includes an upper geneva plate 144 (FIGS. 5, 6, 7, 8, 9 and 10) which is rotatably mounted on the stub shaft 136 in a coaxial relationship with the lower geneva plate 142. The upper geneva plate 144 is connected with the main frame 74 by a rigid torque rod or reaction link 148 (FIGS. 5, 6, 8, 9 and 10). During rotation of the upper geneva plate 144 on the stub shaft 136, the upper geneva plate also rotates relative to the reaction link 148. This results in the reaction link 148 transmitting force between the main frame 74 and the upper geneva plate 144 to move the carriage 88 and shuttle 106 along a linear horizontal path relative to the main frame.

The double geneva drive mechanism 140 also includes a geneva driver plate 152. The geneva driver plate 152 is fixedly connected with a vertical output shaft 154 from the motor 132 (FIGS. 5 and 8). The geneva driver plate 152 is partially disposed between the lower and upper geneva plates 142 and 144 (FIGS. 7 and 8). The geneva driver plate 152 is rotatable about a vertical axis which is coincident with the central axis of the motor output shaft 154 and is offset from the vertical axis of the stub shaft 136.

Figure 9:
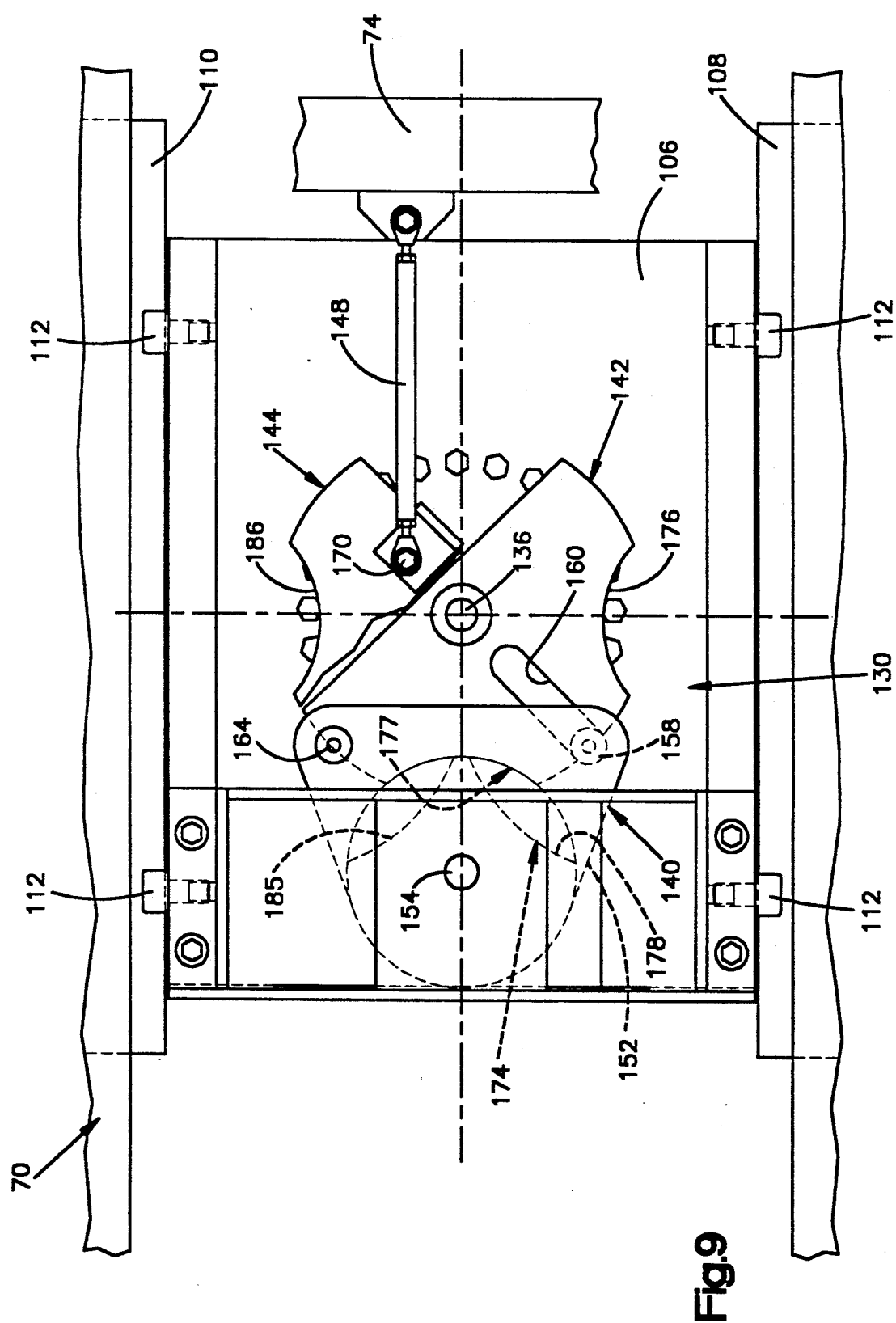
FIG. 9 is a partially broken away plan view, generally similar to FIG. 6, illustrating the relationship between the lower geneva plate and the geneva driver plate after they have been rotated through 90° from the initial position of FIG. 6.

A downwardly projecting or lower cam roller 158 (FIGS. 5, 6, 7, 8, 9, and 10) on the geneva driver plate 152 is engageable with a linear radially extending cam slot 160 (FIGS. 5 and 9) in the lower geneva plate 142. Rotation of the geneva driver plate 152 through 90° with the cam roller 158 in engagement with the slot 160 in the lower geneva plate 142 causes the cam roller to rotate the lower geneva plate, stub shaft 136 and carriage 88 through 90°. Thus, rotation of the geneva driver plate 152 through 90° in a clockwise direction, from the initial position shown in FIG. 6 to the intermediate position shown in FIG. 9, rotates the lower geneva plate 142 through 90° in a counterclockwise direction. This moves the lower geneva plate 142 from a position disposed in vertical alignment with the upper geneva plate 144 (FIG. 6) to a position in which the lower geneva plate 142 is offset by 90° from the upper geneva plate 144 (FIG. 9). During this rotation of the lower geneva plate 142, the upper geneva plate 144 remains stationary relative to the shuttle 106 and main frame 74.

An upwardly projecting upper cam roller 164 (FIGS. 5, 6, 7, 8, 9, and 10) on the geneva driver plate 152 is engageable with a linear radially extending cam slot 166 in the upper geneva plate 144 (FIGS. 5, 6, and 10) during continued rotation of the geneva driver plate 152 from the intermediate position of FIG. 9. As the geneva driver plate 152 continues to rotate in a clockwise direction through 90° from the intermediate position of FIG. 9 to the final position of FIG. 10, the cam roller 164 causes the upper geneva plate 144 to rotate through 90° relative to the stub shaft 136 and shuttle 106.

As the upper geneva plate 144 rotates relative to the stub shaft 136, the rigid reaction link 148 transmits force between the main frame 74 and the upper geneva plate 144. This force is transmitted through the stub shaft 136 to the carriage 88 and from the stub shaft 136 through the bearing assembly 120 to the shuttle 106. The force transmitted by the reaction link 148 moves the shuttle 106 and carriage 88 along a linear horizontal path relative to the main frame 74. The shuttle 106 moves along the linear horizontal path from the retracted position of FIGS. 6 and 9 to the extended position of FIG. 10.

Figure 10:
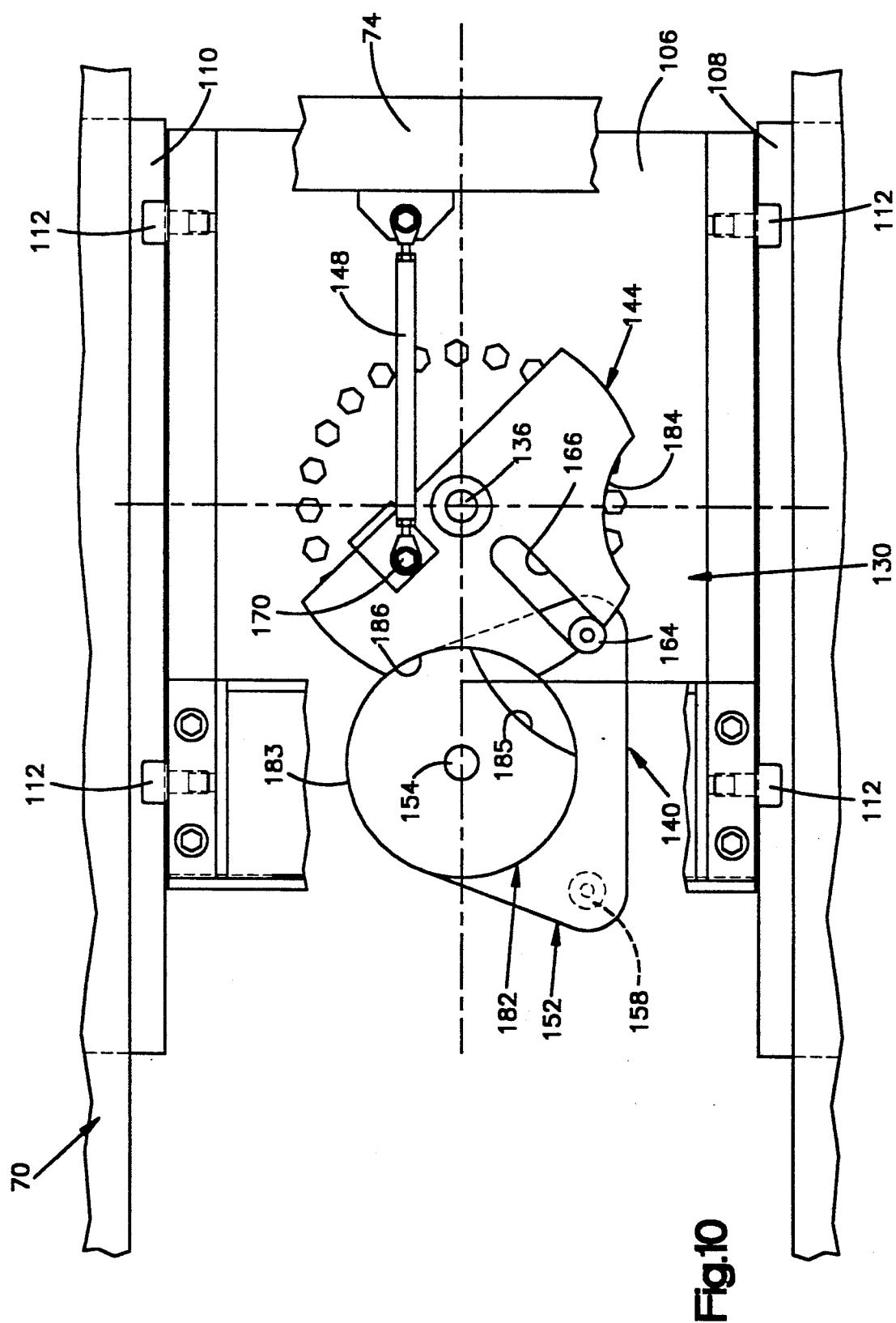
FIG. 10 is a partially broken away plan view, generally similar to FIG. 9, illustrating the relationship between the upper geneva plate and the geneva driver plate after the geneva driver plate has been rotated through 90° from the position shown in FIG. 9.

To move the shuttle 106 along the linear horizontal path, the upper geneva plate 144 is rotated, in a counterclockwise direction, by the geneva driver plate 152 from the position shown in FIG. 9 to the position shown in FIG. 10. As this occurs, the upper geneva plate 144 is effective to pull on the rigid reaction link 148 and push the shuttle 106 along the guide rails 108 and 110 toward the vertical plane 64 (FIG. 1). As the shuttle 106 moves along the guide rails 108 and 110, the upper geneva plate 144 rotates about a vertical central axis of a connection 170 (FIGS. 9 and 10) between the reaction link 148 and upper geneva plate 144. Thus, the upper geneva plate 144 rotates about both the stub shaft 136 and the reaction link connection 170 as the shuttle 106 moves relative to the main frame 74.

A generally circular lower locking plate 174 (FIGS. 5 and 8) is fixedly connected with the motor output shaft 154. A circular outer side surface 175 (FIG. 5) on the lower locking plate 174 engages an arcuate recess 176 (FIGS. 5 and 9) in the lower geneva plate 142 when the lower geneva plate is in the initial position of FIG. 6. The lower locking plate 174 and lower geneva plate 142 cooperate to hold the lower geneva plate and the carriage 88 against rotation relative to the shuttle 106 when the lower geneva plate is in the initial position of FIG. 6.

When the lower geneva plate 142 is to be rotated by the geneva driver plate 152, an arcuate recess 178 (FIGS. 5 and 9) in the lower locking plate 174 cooperates with the lower geneva plate 142 to allow the lower geneva plate to rotate relative to the shuttle 106. As the lower geneva plate 142 is rotated from the initial position of FIG. 6 to the final position of FIG. 9 by the geneva driver plate 152, the circular outer side surface 175 on the lower locking plate 174 moves into engagement with an arcuate recess 177 in the lower geneva plate 142 (FIG. 9). Engagement of the outer side surface 175 on the lower locking plate 174 with the recess 177 holds the lower geneva plate 142 and carriage 88 against rotation during continued rotation of the geneva driver plate 152 from the intermediate position of FIG. 9 to the final position of FIG. 10.

An upper locking plate 182 (FIGS. 5, 8 and 10) is fixedly connected with the motor output shaft 154. A circular outer side surface 183 (FIG. 5) on the upper locking plate 182 engages an arcuate recess 184 in the upper geneva plate 144 (FIG. 6) when the upper geneva plate is in the initial position of FIG. 6. The upper locking plate 182 and upper geneva plate 144 cooperate to hold the upper geneva plate against rotation relative to the main frame 74 and shuttle 106 when the upper geneva plate is in the initial position of FIG. 6.

When the upper geneva plate 144 is to be rotated by the geneva driver plate 152 to move the carriage 106 relative to the main frame 74, an arcuate recess 185 (FIGS. 5 and 10) in the upper locking plate 182 cooperates with the upper geneva plate 144 to allow the upper geneva plate to rotate relative to the stub shaft 136 and shuttle 106. As the upper geneva plate 144 is rotated from the initial position of FIGS. 6 and 9 by the geneva driver plate 152, the circular outer side surface 183 on the upper locking plate 182 moves into engagement with an arcuate recess 186 in the upper geneva plate 144 (FIG. 10). Engagement of the outer side surface 183 on the upper locking plate 182 with the recess 186 holds the upper geneva plate 144 and the shuttle 106 against movement when the geneva driver plate 152 is in the final position of FIG. 10.

In the embodiment of the carriage drive assembly 130 illustrated in FIGS. 5-9, the rotation of the carriage 88 is completed before movement of the shuttle 106 begins. However, movement of the shuttle 106 could begin before rotation of the carriage 88 ends. In order to have movement of the shuttle 106 begin before rotation of the carriage 88 ends, the geneva driver plate 152 must move the upper cam roller 164 into engagement with the cam slot 166 in the upper geneva plate 144 before the lower cam roller 158 moves out of engagement with the cam slot 160 in the lower geneva plate 142. This can be accomplished by reducing the angle between the cam rollers 158 and 154 from the 90° angle in the embodiment of the geneva driver plate shown in FIGS. 6, 9 and 10.

By having the angle between the cam rollers 158 and 164 less than the 90° angle through which the geneva driver plate 152 is rotated to rotate the lower geneva plate 142, rotation of the upper geneva plate 144 begins before rotation of the lower geneva plate 142 is completed. For example, the angle between the upper and lower cam rollers 58 and 164 could be reduced to 75°. If this is done, the upper cam roller 164 would engage the cam slot 166 in the upper geneva plate 144 while 15° of rotation of the carriage 88 remains to be completed by rotation of the lower geneva plate 142. Therefore, the carriage 88 rotates relative to the shuttle 106 while the shuttle and carriage both move along the guide rails 108 and 110 relative to the main frame 74 during 15° of rotation of the geneva driver plate 152. The distance for which the shuttle 106 moves with the carriage 88 rotating is not large enough to have the load 30 extend through the vertical plane 64.

During the transfer of a load 30 from the stacker crane 46 to the vehicle 22, the shuttle 106 and load carriage 88 are moved away from the vertical plane 64. Thus, the shuttle 106 moves from the extended position of FIG. 10 to the retracted position of FIG. 9. Thereafter, the load carriage 88 is rotated about its vertical central axis to orient the load for engagement by the lift table 28 (FIG. 3) of the vehicle 22. This movement of the shuttle 106 and rotation of the load carriage 88 is accomplished by reversing the direction of operation of the motor 132.

When a load 30 has been transferred from the stacker crane 46 to the load carriage 88 with the shuttle 106 at the extended position of FIG. 10, the end 36 of the load 30 is disposed in the vertical plane 64. Before rotating the load carriage 88, it is necessary to first move the shuttle 106 from the extended position of FIG. 10 toward the retracted position of FIG. 9. This enables the load carriage 88 to be rotated about its vertical axis to orient the load 30 for engagement by the shuttle on the vehicle 22 without having the load move through the vertical plane 64.

To move the carriage 106 from the extended position of FIG. 10 to the retracted position of FIG. 9, the direction of operation of the motor 132 is reversed to rotate the geneva driver plate 152 in a counterclockwise direction. This causes the upper cam roller 164 on the geneva driver plate 152 to engage the cam slot 166 and rotate the upper geneva plate 144 in a clockwise direction about the vertical stub shaft 136. As the upper geneva plate 144 is rotated about the stub shaft 136, the upper geneva plate pushes against the rigid reaction link 148. This moves the shuttle 106 toward the left (as viewed in FIG. 10). As the shuttle 106 moves leftward, the upper geneva plate 144 rotates about both the connection 170 with the reaction link 148 and the stub shaft 136.

As the shuttle 106 moves to the retracted position, the geneva driver plate 152 move to the intermediate position shown in FIG. 9. The upper geneva plate 144 has rotated back to its initial position. Continued rotation of the geneva driver plate 152 in a counterclockwise direction moves the lower cam roller 158 into the cam slot 160.

Figure 6:
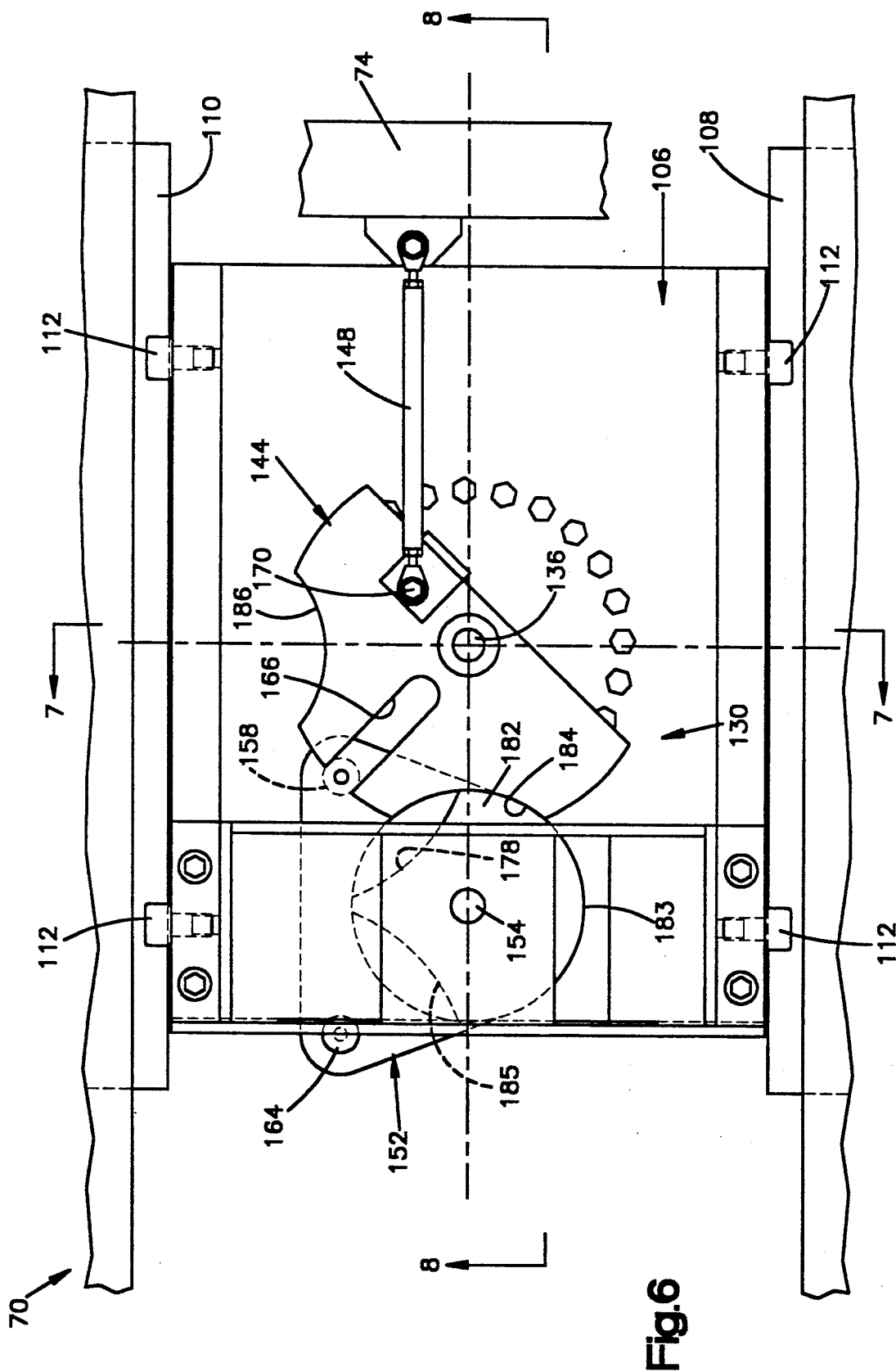
FIG. 6 is an enlarged fragmentary plan view of a portion of the load rotator assembly and illustrating the relationship between a carriage drive assembly and a shuttle on which the load carriage of FIGS. 3 and 4 is rotatably mounted.

As the geneva driver plate 152 continues to rotate, the lower geneva plate 142 is rotated to rotate the load carriage 88. Thus, the lower geneva plate 142 is rotated in a clockwise direction about the stub shaft 136 from the final position shown in FIG. 9 to the initial position. When the lower geneva plate 142 is in the initial position, it is vertically aligned with the upper geneva plate 144 (FIG. 6). As this occurs, the carriage 88 is rotated through 90° to orient the load 30 for engagement by the vehicle 22.

Operation

Figure 3:
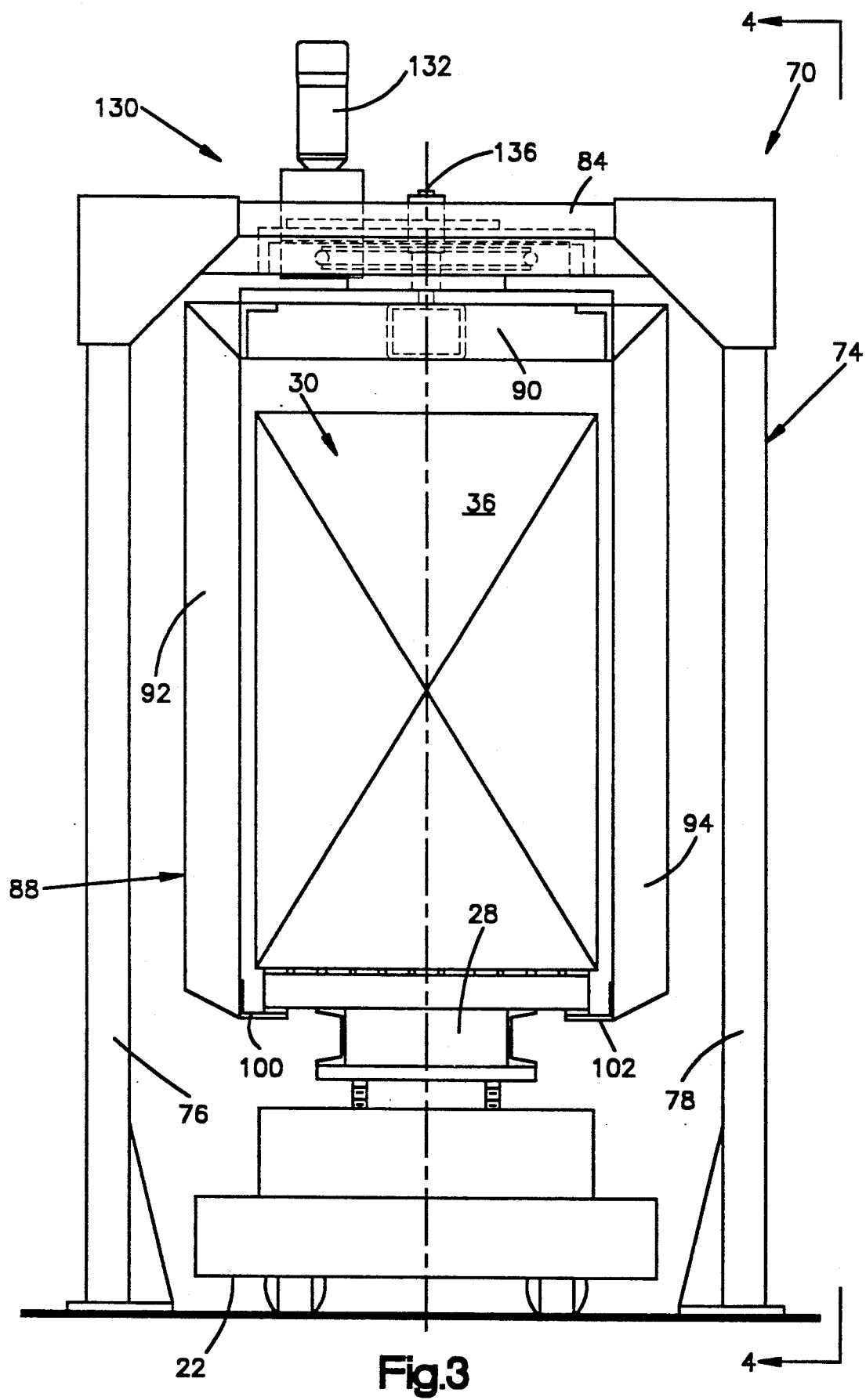
FIG. 3 is a side elevational view, taken generally along the line 3—3 of FIG. 2, illustrating the relationship of a load to a carriage and main frame of the load rotator assembly, a vehicle for carrying a load to and from the load rotator assembly being shown in a load transfer position.

When an incoming load 30 is to be moved from the loading dock to a storage location 56, the load is first placed on the lift table 28 of the vehicle 22 (FIG. 3). The load 30 is supported on the lift table 28 of the vehicle 22 with the longitudinal central axis of the load parallel to the central axis 26 (FIG. 1) of the main aisle 24. At this time, the load carriage 88 (FIG. 3) is positioned with the load support rails 100 and 102 extending parallel to the central axis 26 of the main aisle. The carriage drive assembly 130 is in the initial condition of FIG. 6.

Once the vehicle 22 has moved the load 30 into the carriage 88, the lift table 28 of the vehicle 22 is lowered and the load is transferred to the rails 100 and 102. The load 30 remains supported by the carriage 88. At this time, the ends 36 and 38 of the load 30 extend perpendicular to the central axis 26 of the main aisle 24 and perpendicular to the central axis 50 of the storage aisle 48.

The carriage drive assembly 130 (FIGS. 5-8) is then operated to rotate the load 30 and carriage 88 about the vertical central axis of the carriage. At this time, the carriage support shuttle 106 is in the retracted position of FIG. 6. Therefore, the corners of the load 30 do not move through the vertical plane 64 a the carriage drive assembly 130 rotates the carriage 38. This eliminates any possibility of interference between the load 30 and the stacker crane 46.

During operation of the carriage drive assembly 130 to rotate the carriage 88, the lower cam roller 158 on the geneva drive plate 152 (FIGS. 5 and 9) engages the cam slot 160 in the lower geneva plate 142. Operation of the motor 132 rotates the geneva driver plate 152 and cam roller 158 to rotate the lower geneva plate 142 through 90° to the position shown in FIG. 9. Since the lower geneva plate 142 is fixedly connected with the stub shaft 136 and carriage 88, the carriage and load 30 are rotated through 90°. This moves the ends 36 and 38 of the load 30 into a parallel relationship with the longitudinal central axis 50 of the storage aisle 48. During rotation of the lower geneva plate 142 and carriage 88, the upper locking plate 182 engages a recess 184 in the upper geneva plate 144 (FIGS. 5 and 10) to hold the upper geneva plate 144 and shuttle 106 stationary relative to the main frame 74.

When the rotation of the carriage 88 has been completed, the ends 36 and 38 of the load 30 are parallel to the longitudinal central axis 50 of the storage aisle 48. However, the end 36 of the load 30 is offset from the vertical plane 64 through the ends 36 of loads 30 at storage locations 56. Therefore, if, at this time, the shuttle 54 on the stacker crane 46 was extended to pickup the load 30, the load would be offset outwardly from its intended position on the stacker crane shuttle. This would result in the load 30 being placed at a storage location 56 with the end 36 of the load offset from the vertical plane 64 extending through the ends of other loads at other storage locations 56.

Continued operation of the carriage drive assembly 130 moves the end 36 of the load 30 toward the vertical planes 64 and 66 (FIG. 1) until the end 36 of the load 30 is at the vertical plane 64. To move the end 36 of the load 30 toward the parallel vertical planes 64 and 66, the upper cam roller 164 on the geneva driver plate 152 engages cam slot 166 in the upper geneva plate 144 (FIGS. 5 and 6). Continued operation of the drive motor 132 continues the rotation of the geneva driver plate 152 from the intermediate position of FIG. 9 to the final position of FIG. 10. This causes the upper geneva plate 144 to rotate.

Although the upper geneva plate 144 is rotatably mounted on the stub shaft 136 connected with the carriage 88, the upper geneva plate 144 rotates about both the stub shaft and the connection 170 between the end of the reaction link 148 and the upper geneva plate (FIGS. 6 and 10). The rotational movement of the upper geneva plate 144 about the connection 170 with the reaction link 148 results in the stub shaft 136, load carriage 88, and carriage support shuttle 106 being pulled forwardly toward the planes 64 and 66. Thus, the carriage support shuttle 106 moves along a linear horizontal path from the retracted position of FIG. 9 to the extended position of FIG. 10. During rotation of the upper geneva plate 144, the lower locking plate 174 engages the recess in the lower geneva plate 142 to hold the lower geneva plate and carriage 88 against rotation relative to the shuttle 106.

When the end 36 of the load 30 reaches the plane 64, the operation of the carriage drive assembly 130 is stopped. The stacker crane 46 is then moved along the storage aisle 48 to align the shuttle 54 on the stacker crane with the load in the load rotator assembly 70. The stacker crane shuttle 54 is then extended to move beneath the load in the load rotator assembly 70. Once the stacker crane shuttle 54 has been fully extended beneath the load 30 in the load rotator assembly 70, the stacker crane shuttle 54 is raised to lift the load off of the carriage support rails 100 and 102 (FIG. 3). The stacker crane shuttle 54 is then retracted to move the load 30 onto the stacker crane 46.

The stacker crane 46 is then moved along the storage aisle 50 to a position adjacent to a vertical row of storage locations containing the storage location 56 where the load 30 is to be stored. The stacker crane shuttle 54 is then moved to a level at which the load on the shuttle is above load support rails on the storage rack at the selected storage location 56. The stacker crane shuttle 54 is then extended to move the load into the selected storage location 56 with the load slightly above the storage rails. The stacker crane shuttle 54 is then lowered to deposit the load on the storage rails at the selected storage location. The stacker crane shuttle 54 is then retracted.

Immediately after the stacker crane 46 removes a load 30 from the load rotator assembly 70, the operation of the carriage drive assembly 130 may be reversed to return the load rotator assembly 70 to its initial condition. Thus, the direction of operation of the motor 132 is reversed. The geneva driver plate 152 rotates the upper geneva plate 144 to move the carriage support shuttle 106 rearwardly from the extended position of FIG. 10 to the retracted position of FIG. 9. Continued rotation of the geneva driver plate 152 rotates the lower geneva plate 142 to rotate the carriage 88 back to its initial position. As the carriage 88 rotates back to its initial position, load rails 100 and 102 move into a parallel relationship with the longitudinal central axis 26 of the main aisle 24.

The foregoing description of the operation of the load rotator assembly 70 has been in conjunction with the transfer of a load from the vehicle 22 to a storage location 56. If a load is to be transferred from a storage location 56 to the vehicle 22, the sequence of operation would be reversed. Thus, the load rotator assembly 70 can be used during the transfer of loads either to or from a load storage location 56.

Conclusion

An improved material handling apparatus 20 constructed in accordance with the present invention includes a load rotator assembly 70 which sequentially positions loads 30 for transfer between vehicles 22 and 46 which move along aisles 24 and 48. The load rotator assembly 70 includes a carriage 88 which receives loads from a first vehicle 22 which is movable along a main aisle 24. The carriage 88 rotates the load 30 about a vertical axis to position the load for engagement by a second vehicle 46 which moves along a storage aisle 48.

To eliminate any possibility of engagement of a load 30 with the second vehicle 46 during rotation of the load 30 by the load rotator assembly 70, the load is maintained to one side of a vertical plane 64 extending through the ends 36 of loads 30 at storage locations 56 during rotation of the load by the load rotator assembly 70. To position the load 30 for engagement by the second vehicle 46 and for subsequent transfer to a storage location 56, the carriage 88 is moved toward the vertical plane 64 to move the end 36 of the load to a desired location for engagement by the second vehicle 46 which moves along the storage aisle 48.

The carriage 88 is rotatably mounted on a shuttle 106 which is movable toward and away from the storage aisle 48. A carriage drive assembly 130 is mounted on the shuttle 106 and includes a geneva plate 142 which is connected with the carriage 88. The geneva plate 142 is rotated to rotate the carriage 88 to align the load 30 for transfer to the vehicle 46 which moves along the storage aisle 48. A second geneva plate 144 is rotated relative to the shuttle 106 to move the shuttle 106 and carriage 88 toward the storage aisle 48. This movement of the shuttle 106 positions the end of the load 30 for engagement by the second vehicle 46 which moves along the storage aisle 48.

Having described a specific preferred embodiment of the invention, the following is claimed:

1. A material handling apparatus, said material handling apparatus comprising load rotator means disposed on a first side of a vertical plane for positioning a load relative to the vertical plane, said load rotator means including carriage means for receiving loads with an end of the load extending transversely to the vertical plane, and carriage drive means for rotating said carriage means about a vertical axis while maintaining the load on said carriage means on the first side of the vertical plane to align the end of the load on said carriage means with the vertical plane and for moving said carriage means toward the vertical plane to move the end of the load on said carriage means toward the vertical plane with the end of the load aligned with the vertical plane, said carriage drive means including a first geneva plate fixedly connected with said carriage means for rotation therewith about the vertical axis, a second geneva plate connected with and rotatable relative to said carriage means about the vertical axis, geneva drive means for rotating said first geneva plate and carriage means about the vertical axis while holding said second geneva plate against rotation during at least a portion of the rotation of said first geneva plate and for rotating said second geneva plate about the vertical axis while holding said first geneva plate and carriage means against rotation during at least a portion of the rotation of said second geneva plate, and means for moving said carriage means and said first and second geneva plates toward the vertical plane while said second geneva plate is rotation by said geneva drive means.

2. An apparatus as set forth in claim 1 wherein said first geneva plate includes surface means for defining a first cam slot, said second geneva plate including surface means for defining a second cam slot, said geneva drive means including a geneva driver plate rotatable about a vertical axis offset to one side of the vertical axis about which said carriage means rotates, a first cam element connected with said geneva driver plate and engageable with said first cam slot to rotate said first geneva plate during rotation of said geneva driver plate, and a second cam element connected with said geneva driver plate and engageable with said second cam slot to rotate said second geneva plate during rotation of said geneva driver plate.

3. An apparatus as set forth in claim 2 wherein said first geneva plate includes surface means for defining a first arcuate locking surface, said second geneva plate including surface means for defining a second arcuate locking surface, said geneva drive means including a first locking plate connected with said geneva driver plate for rotation therewith and engageable with said first locking surface to hold said first geneva plate and carriage means against rotation during at least a portion of the rotation of said second geneva plate and a second locking plate connected with said geneva driver plate for rotation therewith and engageable with said second locking surface to hold said second geneva plate against rotation during at least a portion of the rotation of said first geneva plate and carriage means.

4. An apparatus as set forth in claim 1 wherein said load rotator means includes a stationary main frame and means for supporting said carriage means for rotation relative to said main frame, said carriage drive means including a rigid connector element having a first end portion connected with said main frame and a second end portion connected with said second geneva plate.

5. A material handling apparatus as set forth in claim 1 wherein said load rotator means includes a stationary main frame, a shuttle disposed on said main frame and movable toward and away from th vertical plane, bearing means for connecting said carriage means with said shuttle and for supporting said carriage means for rotation relative to said shuttle, said means for moving said carriage means and said first and second geneva plates includes means for moving said shuttle relative to said main frame.

6. An apparatus as set forth in claim 5 wherein said carriage drive means is mounted on said shuttle and is movable with said shuttle relative to said main frame.

7. An apparatus as set forth in claim 1 further including a first vehicle movable toward and away from said load rotator means along a main aisle, a second vehicle movable toward and away from said load rotator means along a storage aisle, said first vehicle being operable to sequentially position loads on said carriage means with the ends of the loads extending perpendicular to the vertical plane, said second vehicle including means for sequentially removing loads from said carriage means with the end of each load extending parallel to the vertical plane.

8. A material handling apparatus, said material handling apparatus comprising load rotator means disposed on a first side of a vertical plane for positioning a load relative to the vertical plane, said load rotator means including a stationary main frame, a shuttle disposed on said main frame and movable toward and away from the vertical plane, carriage means for receiving loads with an end of the load extending transversely to the vertical plane, bearing means for connecting said carriage means with said shuttle and for supporting said carriage means for rotation relative to said shuttle, carriage drive means for rotating said carriage means about a vertical axis while maintaining the load on said carriage means on the first side of the vertical plane to align the end of the load on said carriage means with the vertical plane and for moving said carriage means toward the vertical plane to move the end of the load on said carriage means toward the vertical plane with the end of the load aligned with the vertical plane, said carriage drive means being mounted on said shuttle and being movable with said shuttle relative to said main frame, said carriage drive means including a first member fixedly connected with said carriage means for rotation therewith relative to said shuttle about the vertical axis, a second member rotatable about the vertical axis relative to said first member and said carriage means, drive means for rotating said first member and carriage means about the vertical axis relative to said shuttle and for rotating said second member about the vertical axis relative to said shuttle, and means for moving said shuttle and carriage means toward the vertical plane under the influence of force transmitted by said second member during rotation of said second member relative to said shuttle.

9. An material handling apparatus as set forth in claim 8 wherein said carriage drive means includes means for initiating movement of said carriage means toward the vertical plane upon completion of rotation of said carriage means about the vertical axis.

10. An apparatus as set forth in claim 8 further including a first vehicle movable toward and away from said load rotator means along a main aisle, a second vehicle movable toward and away from said load rotator means along a storage aisle, said first vehicle being operable to sequentially position loads on said carriage means with the ends of the loads extending perpendicular to the vertical plane, said second vehicle including means for sequentially removing loads from said carriage means with the end of each load extending parallel to the vertical plane.

11. A material handling apparatus, said material handling apparatus comprising a main frame having a plurality of upwardly extending supports and a bridge section connected with upper end portions of said supports, a shuttle disposed on said bridge section and movable relative to said bridge section along a path, carriage means at least partially disposed between said supports for sequentially receiving loads, means for connecting said carriage means with said shuttle for movement along the path and for enabling said carriage means to rotate relative to said shuttle about a vertical axis, and drive means disposed on said shuttle and connected with said carriage means, shuttle and main frame for rotating said carriage means about the vertical axis relative to said shuttle and for moving said shuttle along the path relative to said bridge section, said drive means including a motor disposed on said shuttle, a first member connected with said carriage means and rotatable about the vertical axis by operation of said motor to rotate said carriage means relative to said shuttle about the vertical axis, a second member connected with said carriage means and rotatable about the vertical axis by operation of said motor, and means for transmitting force between said second member and said main frame to move said shuttle along the path relative to said main frame upon rotation of said second member by said motor.

12. An apparatus as set forth in claim 11 wherein said first member is a first geneva plate and said second member is a second geneva plate.

13. An apparatus as set forth in claim 11 wherein said means for transmitting force between said second member and said main frame is a rigid connector link having a first end portion connected with said second member and a second end portion connected with said main frame.

14. An material handling apparatus, said material handing apparatus comprising a frame, a shuttle mounted on said main frame and movable relative to said main frame along a linear path, a carriage connected with a rotatable relative to said shuttle about a vertical axis extending through said carriage, said carriage having surface means for receiving a load with the load in a first orientation, and drive means disposed on said shuttle and connected with said main frame for rotating said carriage about the vertical axis to change the orientation of the load from the first orientation to a second orientation and for moving said shuttle relative to said main frame along the linear path with the load on said carriage in the second orientation, said drive means includes a first member connected with said carriage for rotation therewith relative to said shuttle about the vertical axis, a second member connected with said carriage and rotatable relative to said carriage and shuttle about the vertical axis, a rigid connector link having a first end portion connected with said second member at a location offset from the vertical axis and a second end portion connected with said main frame, said drive means including means for rotating said second member about the vertical axis and about the first end portion of said connector link to move said shuttle and carriage along the linear path.

15. An apparatus as set forth in claim 14 wherein said drive means includes first locking means mounted on said shuttle for movement therewith relative to said main frame and engageable with said first member to hold said first member and carriage against rotation relative to said shuttle during at least a portion of the rotation of said second member relative to said shuttle and carriage, and second locking means mounted on said shuttle for movement therewith relative to said main frame and engageable with said second member to hold said second member against rotation relative to said shuttle during at least a portion of the rotation of said first member relative to said shuttle.

16. An apparatus as set forth in claim 14 wherein said drive means includes a motor mounted on said shuttle for movement therewith and a driver connected with said motor and mounted for rotation about a second axis offset from the vertical axis, said driver including means for transmitting drive force from said motor to said first member and for transmitting drive force from said motor to said second member during operation of said motor.

17. An apparatus as set forth in claim 14 wherein said first member is a first geneva plate fixedly connected with said carriage for rotation therewith about the vertical axis, said second member is a second geneva plate connected with and rotatable relative to said carriage about the vertical axis, said drive means including means for rotating said first geneva plate and carriage about the vertical axis while holding said second geneva plate against rotation during at least a portion of the rotation of said first geneva plate, said means for rotating said second member including means for rotating said second geneva plate about the vertical axis while holding said first geneva plate and carriage against rotation during at least a portion of the rotation of said second geneva plate.

18. An apparatus as set forth in claim 17 wherein said first geneva plate includes surface means for defining a first cam slot, said second geneva plate including surface means for defining a second cam slot, said means for rotating said first geneva plate and said means for rotating said second geneva plate including a geneva driver plate rotatable about a vertical axis offset to one side of the vertical axis about which said carriage means rotates, a first cam element connected with said geneva driver plate and engageable with said first cam slot to rotate said first geneva plate during rotation of said geneva driver plate, and a second cam element connected with said geneva driver plate and engageable with said second cam slot to rotate said second geneva plate during rotation of said geneva driver plate.

* * * * *